Dec. 30, 1952     F. A. KRÖGER     2,623,857
ZINC SULFIDE PHOSPHORS CONTAINING ALUMINUM
Filed Jan. 4, 1950
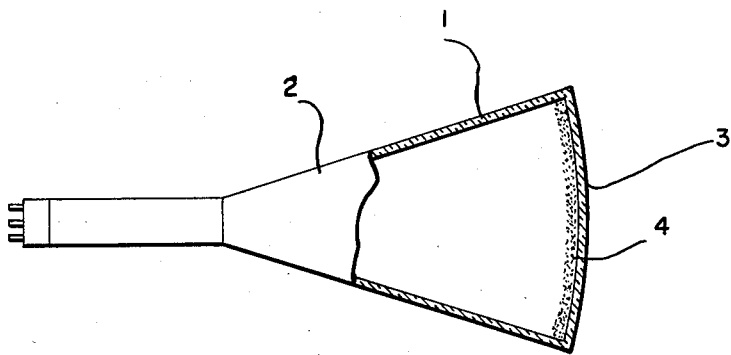
INVENTOR
FERDINAND ANNE KROGER
BY
AGENT Patented Dec. 30, 1952

2,623,857

UNITED STATES PATENT OFFICE 2,623,857

ZINC SULFIDE PHOSPHORS CONTAINING ALUMINUM

Ferdinand Anne Kröger, Eindhoven, Netherlands, assignor to Hartford National Bank and Trust Company, Hartford, Conn., as trustee Application January 4, 1950, Serial No. 136,756
In the Netherlands January 14, 1949

5 Claims. (Cl. 252—301.6)

This invention relates to electric discharge tubes comprising a luminescent substance and to methods of manufacturing luminescent substances for use in electric discharge tubes. Many forms of electric discharge tubes comprising a luminescent substance are known. One of the most important representatives is the cathode-ray tube, which is widely used, in television receivers. More particularly in television receivers it is important that the colour of the luminescent image be attractive to the eye, for example be a white coloured image. Consequently, the aim has been to manufacture luminescent substances which emit white light upon excitation by electrons. The solution most commonly employed hitherto has been the use of a mixture consisting of two luminescent substances of high efficiency, each emitting a portion of the spectrum such that the total light appears to the eye to be substantially white. The substances which give the highest efficiency upon conversion of the energy of electrons into light are zinc-sulphides, zinc-cadmium sulphides and the corresponding sulpho-selenides, which are activated with one or more heavy metals. Since with a suitable choice of the activators it is possible to manufacture these substances so as to emit different kinds of light upon bombardment by electrons, it has naturally been suggested to provide in television tubes a luminescent screen which contains zinc-sulphides and zinc-cadmium sulphides or sulpho-selenides activated with metals such that two or more colours of light are emitted which jointly give the impression of substantially white light. For this purpose use may be made, for example, of zinc-sulphides or zinc-cadmium sulphides activated with silver or gold.

If use is made of a mixture consisting of zinc-sulphide activated with silver and zinc-cadmium sulphide activated with gold, it is possible to provide a tube which emits substantially white light upon bombardment by electrons.

The above-mentioned substances are, as a rule, manufactured by heating the sulphides together with a small quantity of a salt of the activators with the addition of a halogen compound.

The object of the invention is to provide an electric discharge tube and a method of manufacturing a luminescent substance which provides a better approximation to white light than zinc-sulphide activated with gold and silver or zinc-cadmium sulphide activated with gold and silver.

According to the invention, an electric discharge tube comprising a substance having a substantially white luminescence is characterized in that this substance contains the elements zinc, cadmium, sulphur, gold, silver and aluminium in such quantities that the following conditions are fulfilled:

(a) The atomic ratio between zinc and cadmium is comprised between 97:3 and 84:16;

(b) $10^{-5}$ to $2 \times 10^{-2}$ atoms of gold plus silver are available for every 100 atoms of zinc plus cadmium;

(c) The atomic ratio between gold and silver is comprised between 3:1 and 1:4;

(d) The number of aluminium atoms is at least equal to the sum of the atoms of gold and silver and at the most equal to 0.1 of the number of zinc plus cadmium atoms; and (e) The amount of sulphur is such as is required to produce sulphides of all metals contained in the luminescent substance.

A luminescent substance for use in a discharge tube according to the invention may contain halogen atoms in addition to the above-mentioned elements.

The luminescent substances comprised in an electric discharge tube according to the invention permit of obtaining luminescence colours comprised within the white region of the I. C. I. colour triangle as defined by the Joint Electron Tube Engineering Council (J. E. T. E. C.) on December 12, 1946, which region is described in "Proceedings of the Institute of Radio Engineers" of August 1948, pages 1028 and 1029.

In order that the invention may be better understood, an example will now be given of the manufacture of zinc-cadmium sulphide luminescent substance containing gold, silver and aluminium.

81 gms. of ZnS are mixed with 21 gms. of Cds and 5 gms. of ZnS on which from a solution of $10^{-3}$ atoms of Au per mol. is deposited as a sulphide. The mixture is moistened with 50 ccs., of an aqueous AgNO$_3$ solution ($10^{-3}$ normal) and 30 ccs. of an aqueous Al(NO$_3$)$_3$ solution ($10^{-2}$ normal), vigorously mixed together and dried at 105° C. After drying, the mixing treatment is repeated and the dry mixture subsequently heated for ½ to 1 hour in a quartz beaker at 1100° C. in an atmosphere of H$_2$S.

The substances used in this example are halogen free. However, halogen may also be contained in them. In view thereof, the gold may, as an alternative, be added as a chloride solution.

In order to facilitate crystallisation, use may be made, if necessary, of a fusing agent. Suitable for this purpose are the fluorides of aluminium, beryllium, magnesium, calcium, strontium or barium.

If desired, the luminescent substance may also contain an element or compound which reduces the luminescence without changing the fluorescence. Suitable as such is, for example, nickel in a concentration of about $10^{-4}$ atoms per 100 atoms of zinc plus cadmium.

Although in the foregoing it has been mentioned that the luminescent material emits light upon excitation by electrons, it is observed that it is also rendered luminescent upon excitation by ultraviolet rays or X-rays.

What I claim is:

1. A luminescent material consisting of the fired reaction product of zinc sulphide, cadmium sulphide, gold sulphide, silver sulphide, and aluminum sulphide containing zinc and cadmium in an atomic ratio of about 97:3 to 84:16, gold and silver in an atomic ratio of about 3:1 to 1:4, about $10^{-5}$ to $2 \times 10^{-2}$ atoms of gold plus silver for every 100 atoms of zinc plus cadmium, a number of aluminum atoms at least equal to the sum of silver and gold atoms and at most equal to 0.1 the number of zinc plus cadmium atoms, and sulphur in an amount sufficient to form sulphides of the several metals.

2. A luminescent material consisting of the fired reaction product of zinc sulphide, cadmium sulphide, gold sulphide, silver sulphide, aluminum sulphide, and a halide flux, said product containing zinc and cadmium in an atomic ratio of about 97:3 to 84:16, gold and silver in an atomic ratio of about 3:1 to 1:4, about $10^{-5}$ to $2 \times 10^{-2}$ atoms of gold plus silver for every 100 atoms of zinc plus cadmium, a number of aluminum atoms at least equal to the sum of silver and gold atoms and at most equal to 0.1 the number of zinc plus cadmium atoms, and sulphur in an amount sufficient to form sulphides of the several metals.

3. A method of producing a luminescent material which comprises mixing zinc sulphide and cadmium sulphide in the proportions which upon subsequent heating result in a product containing zinc and cadmium atoms in a ratio between 97:3 and 84:16, applying a solution of gold sulfide containing about $10^{-3}$ atoms of gold per mol to the surface of the zinc-cadmium-sulphide mixture, moistening the thus covered mixture with silver nitrate and aluminum nitrate in amounts producing upon subsequent heating a product containing about $10^{-5}$ to $2 \times 10^{-2}$ atoms of gold plus silver for every hundred atoms of zinc plus cadmium, gold and silver in an atomic ratio of 3:1 to 1:4, and in which the number of aluminum atoms is at least equal to the sum of the atoms of gold and silver and at most equal to 0.1 of the number of zinc plus cadmium atoms, mixing the moistened and covered mixture, and firing the mixture at about 1100° C. in an atmosphere of $H_2S$ for a sufficient time to produce a fired reaction product having luminescent properties.

4. A method of producing a luminescent material which comprises mixing zinc sulphide and cadmium sulphide in the proportions which upon subsequent heating result in a product containing zinc and cadmium atoms in a ratio between 97:3 and 84:16, applying a solution of gold chloride to the surface of the zinc-cadmium-sulphide mixture, moistening the thus covered mixture with silver nitrate and aluminum nitrate in amounts producing upon subsequent heating a product containing about $10^{-5}$ to $2 \times 10^{-2}$ atoms of gold plus silver for every hundred atoms of zinc plus cadmium gold and silver are in an atomic ratio of 3:1 to 1:4, and in which the number of aluminum atoms is at least equal to the sum of the atoms of gold and silver and at most equal to 0.1 of the number of zinc plus cadmium atoms, mixing the moistened and covered mixture, and firing the mixture at about 1100° C. in an atmosphere of $H_2S$ for a sufficient time to produce a fired reaction product having luminescent properties.

5. A method of producing a luminescent material which comprises mixing zinc sulphide and cadmium sulphide in the proportions which upon subsequent heating result in a product containing zinc and cadmium atoms in a ratio between 97:3 and 84:16, applying a solution of gold chloride to the surface of the zinc-cadmium-sulphide mixture, moistening the thus covered mixture with silver nitrate and aluminum nitrate in amounts producing upon subsequent heating a product containing about $10^{-5}$ to $2 \times 10^{-2}$ atoms of gold plus silver for every hundred atoms of zinc plus cadmium, gold and silver in an atomic ratio of 3:1 to 1:4, and in which the number of aluminum atoms is at least equal to the sum of the atoms of gold and silver and at most equal to 0.1 of the number of zinc plus cadmium atoms, adding a fusing agent to the mixture, mixing the moistened and covered mixture, and firing the mixture at about 1100° C. in an atmosphere of $H_2S$ for a sufficient time to produce a fired reaction product having luminescent properties.

FERDINAND ANNE KRÖGER.

REFERENCES CITED

The following references are of record in the file of this patent:

UNITED STATES PATENTS

| Number | Name | Date |
|---|---|---|
| 2,446,764 | Henderson | Aug. 10, 1948 |
| 2,452,522 | Laverenz | Oct. 26, 1948 |
| 2,476,619 | Nicoll | July 19, 1949 |
| 2,479,158 | Froelich | Aug. 16, 1949 |